United States Patent [19]
Percival-Smith

[11] Patent Number: 5,468,106
[45] Date of Patent: Nov. 21, 1995

[54] HYDRAULIC TENSIONING DEVICE

[75] Inventor: Harry D. Percival-Smith, Manchester, England

[73] Assignee: Pilgrim Moorside Limited, England

[21] Appl. No.: 190,083

[22] PCT Filed: Sep. 2, 1991

[86] PCT No.: PCT/GB91/01482
 § 371 Date: Feb. 1, 1994
 § 102(e) Date: Feb. 1, 1994

[87] PCT Pub. No.: WO93/05306
 PCT Pub. Date: Mar. 18, 1993

[51] Int. Cl.[6] .................................... F16B 37/08
[52] U.S. Cl. .................... 411/434; 411/916; 411/917; 411/DIG. 3; 277/27
[58] Field of Search ................... 411/434, 433, 411/432, 916, 917, DIG. 3; 277/205, 236, 27

[56] References Cited

U.S. PATENT DOCUMENTS

| | | | |
|---|---|---|---|
| 2,571,265 | 10/1951 | Leufven | 411/434 |
| 2,783,106 | 2/1957 | Barnhart | 277/236 |
| 3,154,006 | 10/1964 | Novak | 411/434 |
| 3,455,562 | 7/1969 | Burtis | 277/236 |
| 4,739,997 | 4/1988 | Smetana | 277/27 |
| 4,854,798 | 8/1989 | Snyder | 411/916 |
| 5,046,906 | 9/1991 | Bucknell | 411/916 |
| 5,205,568 | 4/1993 | Stoll | 277/27 |

FOREIGN PATENT DOCUMENTS

| | | | |
|---|---|---|---|
| 0129440 | 12/1984 | European Pat. Off. . | |
| 2455788 | 8/1976 | Germany | 411/434 |
| 1590131 | 5/1981 | United Kingdom . | |

Primary Examiner—Flemming Saether
Attorney, Agent, or Firm—Nixon & Vanderhye

[57] ABSTRACT

An annular piston and cylinder device comprises an annular cylinder and a piston therefor, the piston having sidewall portions which extend into the cylinder towards the base thereof in the form of tapering annular webs which together define between them a recess of asymmetrical cross section.

6 Claims, 3 Drawing Sheets

HYDRAULIC TENSIONING DEVICE

TECHNICAL FIELD

This invention relates to hydraulically operated fastening devices. It is particularly concerned with hydraulic nuts, bolts and jacking tools used for tensioning bolts, including stud bolts.

BACKGROUND PRIOR ART

Hydraulic tension devices are well known. Common to most devices of this type is an annular body which can be mounted in encircling relation to a bolt which is to be tensioned and which further features an annular piston and cylinder device arranged to exert force on the bolt in an axial direction. For example, EP-A-0129440 and GB-A-991783 referred to therein disclose arrangements in which a hydraulic jacking tool is built into the face of a nut, bolt, or as a tool in its own right.

GB-A-1590131 discloses a bolt tensioning tool of the type in which the piston acts on a separate screw-threaded puller engaged on the threaded portion of a bolt independently of a nut.

Such devices have been used for many years, for example to secure marine propellers and also in the general industrial fastening field. A typical example is a threaded nut having an annular recess machined into one face to constitute the cylinder of a piston and cylinder device. The recess is equipped with an annular rubber tire and an annular piston. In use, the nut is threaded onto a bolt so that the free end of the piston, which is usually in the form of a flange known as the load ring, abuts the hardware from which the bolt projects. Hydraulic fluid is then admitted into the tire via a passage through the nut body and the tire in turn applies thrust to the piston. This thrust is then transmitted directly to the assembly, causing an increase in the axial length of the bolt together with compression of the assembly. As a result, the nut body is urged away from the assembly and the bolt is subjected to tension. Once a suitable gap has opened up, shims are inserted into the space between the underside face of the nut body and the load ring so that the tension in the bolt is maintained after the hydraulic pressure is relieved. Similar results may be obtained by building an annular piston and cylinder device into the head of a conventional bolt. For somewhat lighter duty application, it is possible to replace the tire with conventional piston seals, in the form of rubber rings.

Attempts have been made to use such piston and cylinder devices to tension bolts in applications where relatively high temperatures are experienced. For example there are applications in land based gas and steam turbines and in the nuclear industry. However at the operating temperatures concerned, which may be in excess of 250° C., the use of conventional rubber seals and rubber tires is impractical. Prolonged exposure to temperatures above around 150° C. cause rapid deterioration of conventional rubbers. Accordingly, in an attempt to overcome this problem, it has been proposed to use a metal tire. Whilst this solution is susceptible of use at temperatures as high as 500° C., the metal tire is an expensive item requiring special techniques for its manufacture.

DISCLOSURE OF THE INVENTION

According to this invention a hydraulic nut, bolt or jacking tool device comprises an annular piston and cylinder device, the piston having axially directed sidewall portions constituted by a pair of tapering annular webs which constitute the only fluid sealing means for said piston and cylinder device, the radially innermost web being thinner than the other web to confer greater flexibility on said innermost web, the webs together defining between them an annular recess whose cross-section is asymmetrical. The webs preferably have substantially the same height in an axial direction, towards of the base of the recess.

The piston is preferably a tight, sliding fit in the cylinder and no conventional rubber seal is employed. Surprisingly, it has been discovered that by use of the asymmetric profile just mentioned it is possible to configure the webs such that a conventional seal is not required. This means that a piston and cylinder device according to this invention is susceptible of use at elevated temperatures in excess of 500°, there being no conventional seal to deteriorate under such conditions. It has been observed that a symmetrical recess does not provide the sealing performance which is required.

To illustrate the effectiveness of the invention, a sample hydraulic nut according to this invention was pressurised to stress a bolt. The bolted assembly was thereafter subjected to sustained temperatures of the order of 250° C., in an oven. On removing the assembly from the oven, it proved possible to re-energise the nut and only after it had been re-energised several times was there any sign of slight leakage. In view of the lack of a conventional seal, this performance was quite outstanding.

In order that the invention be better understood, a preferred embodiment of it will now be described by way of example with reference to the accompanying drawings.

Figure 1:
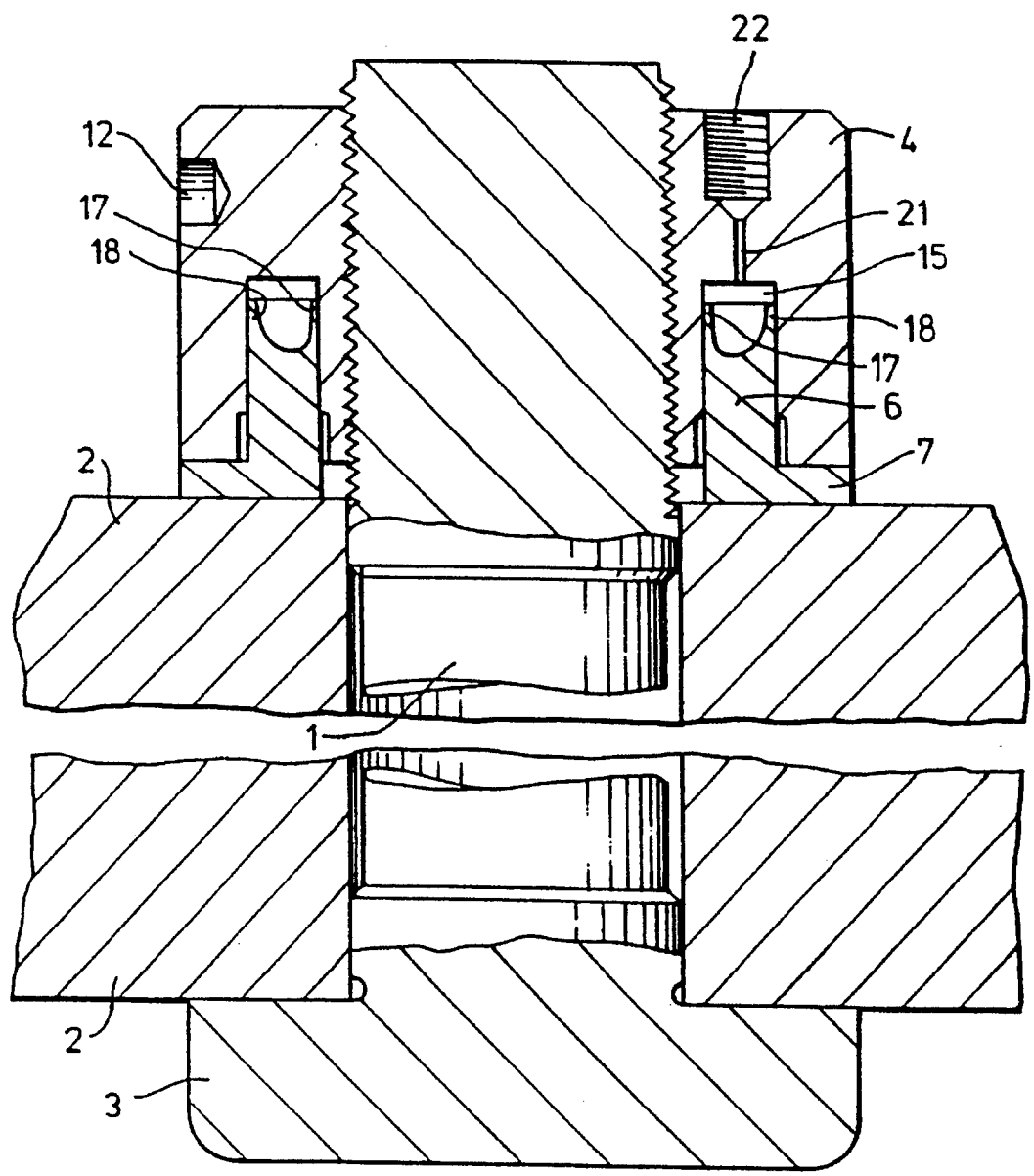
FIG. 1 is a cross section side view through a nut and bolt assembly illustrating a hydraulic tensioning device in accordance with a first exemplary embodiment of the invention.

In the figure, a bolt 1 having a head 3 is used to clamp together an assembly generally designated 2. It will be appreciated that the bolt extends through an aperture in the assembly 2. The free end of the bolt is provided with a hydraulic nut in the form of cylindrical body 4 having an internal screw thread corresponding to that of the bolt 1. The nut 4 is screwed down the bolt, a plurality of tommy bar holes 12 being provided for this purpose. That face of the nut which in use contacts the hardware 2 is provided with an annular piston and cylinder device, comprising a cylinder 15 and a piston 6 which is integral with a load ring 7, the latter abutting against the hardware 2. A port 21 is provided for the injection of hydraulic fluid into the cylinder 15; a screw threaded coupling adaptor 22 being provided for this purpose. That portion of the piston 6 which is in use exposed to hydraulic fluid in the cylinder 15 is provided with annular webs 17 and 18 respectively concentric and directed towards the base of the cylinder so as to define an annular recess between them. The web may taper to constitute a pair of concentric feather edges, sometimes called lineal edges as in the aforementioned GB-A-1590131. Although these webs are of the same height in an axial direction, the annular recess defined between them is asymmetrical. The effect of the asymmetry is such that the web 17 lying radially inwardly of the device is relatively thin compared with the web 18 lying radially outwardly of it. In consequence of this, the web 17 has increased flexibility over that of the web 18. Initally both webs were machined to be a tight but sliding fit in the cylinder 15. In use, with the load ring 7 flush with the face of the nut 4 (with the piston fully retracted) the nut is screwed down firmly against the hardware 2. Hydraulic fluid is then admitted through the adaptor 22 and the port 21 to the cylinder 15. The pressure is thereafter increased causing the nut body 4 to be displaced away from the load ring 7, opening up a gap between the components. When the gap width reaches a point at which a desired level of stress in the bolt 1 has been achieved, shims or distance pieces are inserted into the gap. The hydraulic pressure is thereafter relieved, thereby completing the installation procedure.

To remove the nut for example after a prolonged period at elevated temperature, the procedure is reversed. Oil is admitted under pressure to the cylinder 15; the bolt is subjected to sufficient further stress until the shims or distance pieces can be removed. The hydraulic pressure is thereafter relieved and the nut unscrewed, using the tommy bar holes 12.

It will be appreciated that although described above as built into a nut, such a piston and cylinder construction may be employed built into the head of a bolt or as a separate bolt tensioning tool having an aperture therethrough which is a clearance for a bolt to be tensioned and in which the piston acts upon a screw-threaded puller engaged on a threaded portion of the bolt.

Figure 2:
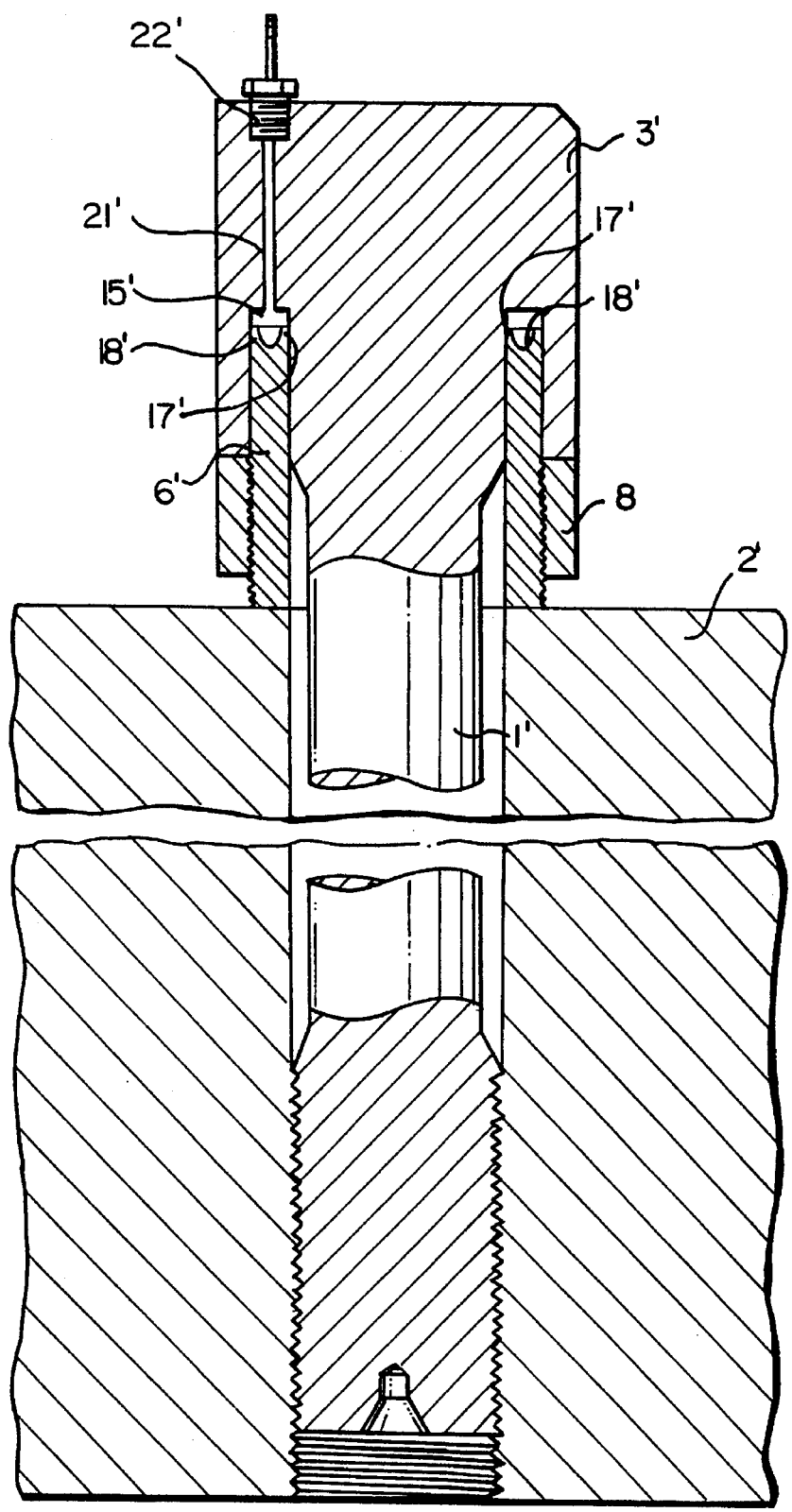
FIG. 2 is a cross sectional side view of an alternative embodiment of the subject invention wherein the hydraulic tension device is incorporated within a bolt head.

Turning to FIG. 2, a tensioning device as described above is built into the head of a bolt, in a manner otherwise similar to that described in EP-A-0129440 referred to hereinabove. For convenience, components corresponding to those in FIG. 1 are indicated by similar reference numerals, but with prime designation added. The operation of this device is otherwise similar to that described in connection with FIG. 1 in that, upon admission of hydraulic fluid through the adaptor 22' to the cylinder 15', the increase in pressure causes the bolt head 3' to move away from the hardware 2' and also away from the locking ring 8. The latter is then screwed back until it abuts the underside of the bolt head 3'. When the hydraulic pressure is relieved, the lock ring 8 maintains the tension on the bolt 1'.

Figure 3:
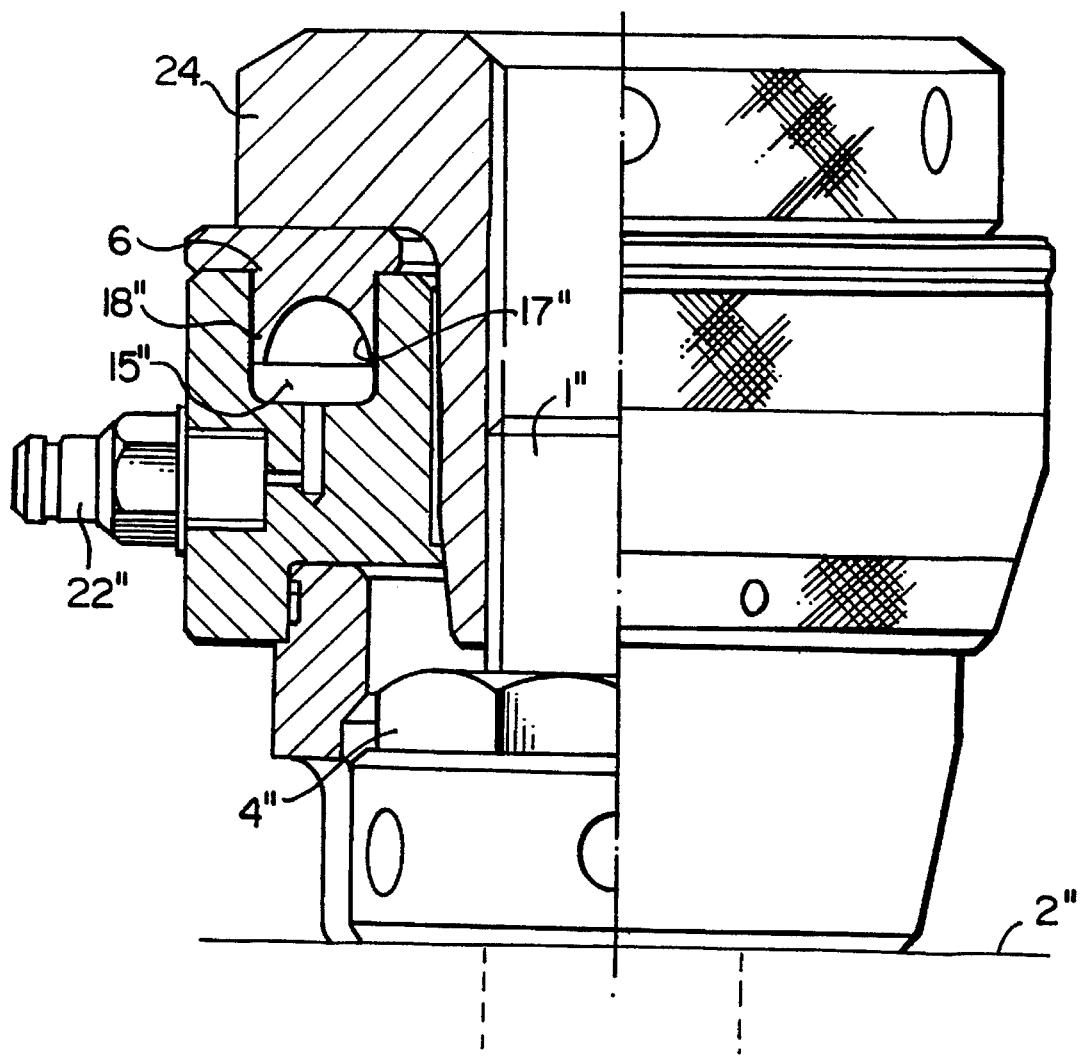
FIG. 3 is a side elevation, partly in section, illustrating a bolt tensioning tool in accordance with the invention.

With reference now to FIG. 3, the hydraulic tension device in accordance with the invention is incorporated in a bolt tensioning tool of the type otherwise described in U.K. patent specification 1,590,131 mentioned hereinabove. Here, hydraulic fluid is introduced into the cylinder 15" through adaptor 22" to act against the webs 17" and 18" such that the piston 6" acts on the screw threaded puller 24 which in turn, is threadably secured to the bolt 1". By stressing the bolt in this manner, the nut 41 may be turned with relative ease, and thus by progressively extending the device, nut 4" can be tightened to the required extent.

I claim:

1. A hydraulic tensioning device comprising two relatively axially displaceable annular metallic bodies effecting an annular piston and cylinder arrangement including a fluid chamber defined between radially innermost and radially outermost walls comprising the cylinder, said radially outermost cylinder wall surrounding an associated radially outermost piston wall and said radially innermost cylinder wall being surrounded by an associated radially innermost piston wall, said radially outermost and radially innermost piston walls being formed with corresponding annular metallic webs, extending axially into the fluid chamber and tapering along their whole lengths to edges and providing, by operative engagement with their associated cylinder walls in response to fluid pressure in the chamber, sole sealing means of the arrangement, the radially innermost web being thinner than, and having a shallower taper than, the radially outermost web at their edges and at corresponding distances from their edges to confer greater flexibility on said radially innermost web, said webs between themselves defining, for part of the chamber, asymmetry in elevational cross section relative to an axial direction.

2. A device according to claim 1 and wherein said webs are, in said axial direction, substantially of the same length.

3. A device as claimed in claim 1 in which the fluid chamber has a closure wall extending between said radially innermost and radially outermost cylinder walls and defining a closed base thereof and the edges of the webs are concentric and form feather edges, directed towards said closed base.

4. A device according to claim 1 and wherein the piston and cylinder device is built into a nut.

5. A device according to claim 1 and wherein the piston and cylinder device is built into the head of a bolt.

6. A piston and cylinder device according to claim 1 and wherein the piston and cylinder device constitutes a bolt tensioning tool having an aperture therethrough which is a clearance for a bolt which is to be tensioned and including an annular puller internally threaded for engagement with said bolt and arranged to be supported for axial displacement with and by the piston and cylinder arrangement.

\* \* \* \* \*